Patented Feb. 20, 1940

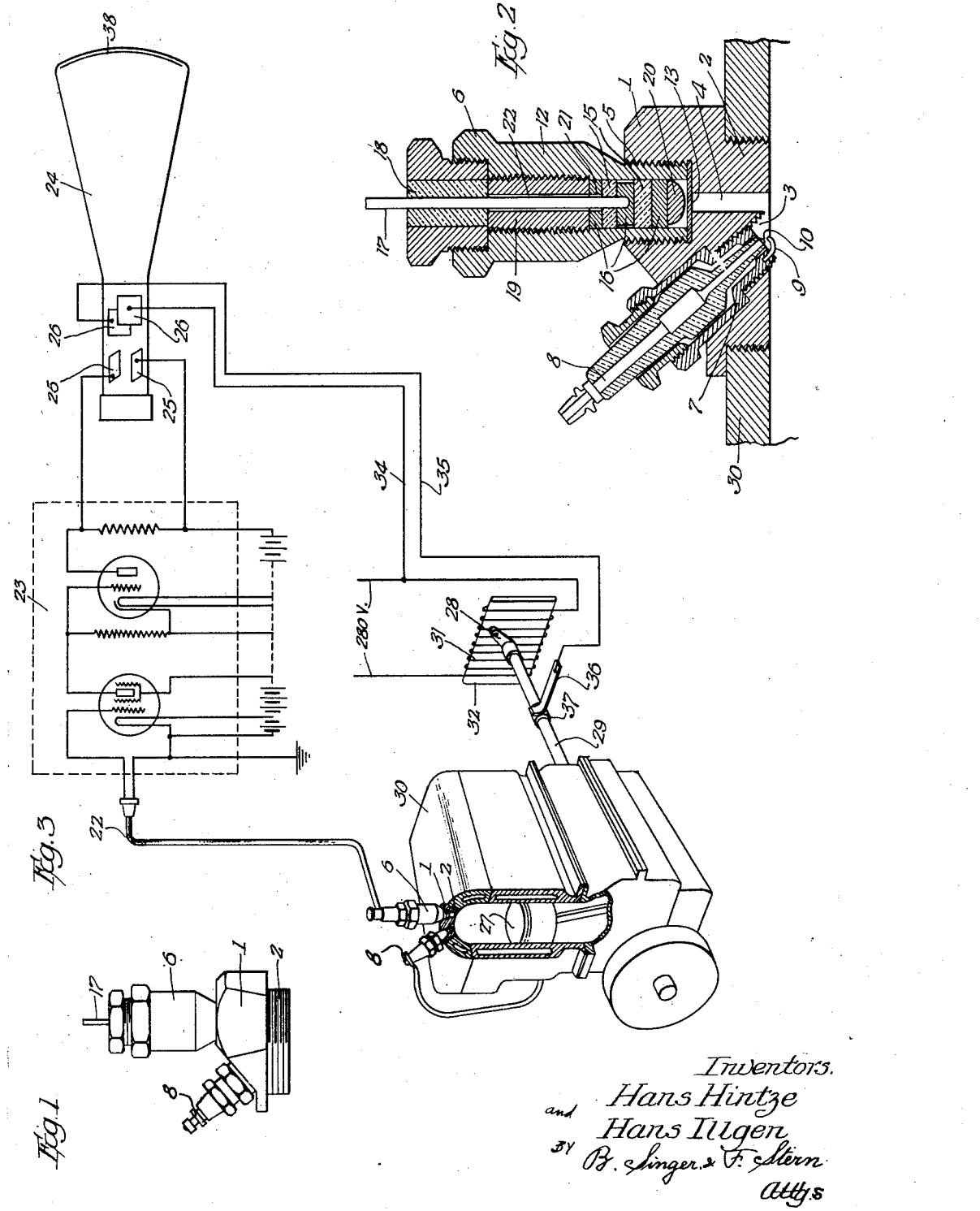

2,190,713

UNITED STATES PATENT OFFICE 2,190,713

PIEZOELECTRIC PRESSURE INDICATOR

Hans Hintze, Dresden, and Hans Illgen, Dresden-Laubegast, Germany, assignors to Zeiss Ikon Aktiengesellschaft, Dresden, Germany Application March 17, 1938, Serial No. 196,342
In Germany February 17, 1937

4 Claims. (Cl. 123—169)

The invention relates to improvements in piezoelectric pressure indicators, particularly for internal combustion engines, and is directed to a novel combination of the piezoelectric pressure element and a spark plug.

It is an object of the present invention to combine a piezoelectric pressure element with a spark plug and insert this structure in the customary threaded aperture provided in an internal combustion engine for the reception of a standard spark plug. In this manner it is not necessary to provide the engine to be tested with a special aperture for the pressure element of the indicator device.

Another object of the invention is to provide an adapter member which fits into the customary threaded aperture of an internal combustion engine normally receiving a standard spark plug, and attaching to this adapter member a piezoelectric pressure element and a miniature spark plug which latter is sufficient to serve in place of the standard spark plug while the engine is being tested.

Still another object of the invention is to attach the miniature spark plug in such manner on the adapter member that the spark gap formed between the electrodes of said small size spark plug will be positioned at the same place in the cylinder of the engine at which the spark gap of the standard size spark plug is positioned.

It is also an object of the invention to form a unitary structure of the piezoelectric pressure element, said miniature spark plug and said adapter member, and attaching said structure as a complete assembly to the engine by screwing said adapter into the standard spark plug aperture.

Other objects of the invention will be apparent or will be specifically pointed out in the following description having reference to the accompanying drawing which illustrates one embodiment of the invention:

Fig. 1 is an elevation view of the test plug of the invention consisting of a combined piezoelectric pressure element and a miniature spark plug.

Fig. 2 is a vertically sectional view of the test plug, and

Fig. 3 illustrates diagrammatically a complete arrangement for indicating the pressure in a combustion engine employing the novel test plug of the invention.

The test plug of the invention comprises an adapter member 1 provided at one end with an exteriorly threaded portion 2 fitting in a standard spark plug aperture of an internal combustion engine and having two bores 3 and 4 respectively arranged at an angle with respect to each other and communicating with each other at the outer end of the threaded portion 2. The bore 4 has an enlarged outer end provided with a thread 5 for receiving the piezoelectric pressure element 6. The other bore 3 is threaded for receiving the threaded end of the sleeve 7 of a miniature spark plug. The outer end of the bore 3 is also enlarged to accommodate the enlarged cylindrical portion of the sleeve 7 and is made sufficiently deep so that the spark gap 10 formed between the center electrode 8 and the body electrode 9 will be located in the same position in the spark plug aperture of the engine at which the spark gap of the normally employed standard spark plug would be located.

The piezoelectric pressure element 6 comprises a sleeve-like casing 12 closed at its lower end which is threadedly connected to the adapter member 1, by a gas-proof diaphragm 13. In the interior of the casing 12 are arranged two measuring discs 15 of quartz between metallic electrode discs 16. It will be noted that three electrode discs 16 are provided and that one quartz disc 15 is arranged between each two electrode discs 16. The electrode discs 16 are provided for conducting the electric charges away from the quartz discs 15. The center electrode 16 receives the charge from the inner faces of the quartz discs 15, while the two other electrodes 16 receive the charges from the outer faces of the quartz discs. The center electrode disc 16 is connected with a conductor 17 extending axially through the pressure element, while the other electrode discs 16 are conductively connected with the metallic casing 12.

The upper end of the conductor 17 is electrically insulated from the casing 12 by an insulating plug 18 of amber and pressure member 19 is interposed between the pile of discs 15, 16 and the insulating plug 18. The upper electrode discs 16 and the pressure member 19 have each a center aperture 21 and 22 respectively of sufficient size to permit the passage of the conductor 17 with sufficient clearance as to not come into contact with the conductor 17. A semi-spherical body 20 is arranged between the diaphragm 13 and the lower electrode disc 16.

This pressure element 6 is employed for converting the gas pressure in the cylinder of the combustion engine into electrical charges of equivalent magnitude. This is made possible by utilizing the so called piezoelectric effect of crystals. Certain crystals, for instance quartz in natural form of rock crystal, develop charges of electricity on their surface when subjected to the action of compressive or tensile stresses.

Since rock crystal is a perfect insulator, the charges thus applied to the crystals by pressure remain on the surface as long as the stress continues to act on the crystal. The magnitude of the charge corresponds now exactly to that of the stress which therefore can be regarded as a measure of the load applied.

In the present case two quartz discs 15 are provided, which are connected in parallel to increase the total charge of electricity produced. Obviously, any desired number of quartz discs may be employed and the same be electrically connected with each other in any desired manner.

The pressure in the cylinder of the combustion engine is transmitted through the bore 4 to the diaphragm which in turn acts on the body 20 and the pile of discs 15, 16.

Since the quantities of electricity involved are extremely small, they must be amplified before they can be used for the purpose of indicating the pressure in the engine.

Referring to Fig. 3, which illustrates diagrammatically a complete pressure indicating device, it will be noted that the piezoelectric pressure element 6 is electrically connected by a two-conductor cable 22 with an amplifier 23 the output of which is applied to one pair of the deflecting plates 25 of a Braun tube 24. The other pair of deflecting plates 26 which is arranged perpendicular to the first named pair, is provided with a potential corresponding to the position of the piston in the cylinder or the angular phase of the crank.

The variable potential applied to the deflecting plates 26 may be produced by a piston displacement transmitter comprising a potential divider in which a rotatable contact member 28 driven by the crankshaft 29 of the combustion engine 30 picks up potentials corresponding to the momentary position of the piston 27. A device of this type is described in the U. S. patent specification No. 2,120,100 of June 7, 1938, Serial No. 750,210, filed October 26, 1934. In the present instance the contact member 28 is moved in a circular path over a resistance 31 wound on a plate 32 and connected to a source of direct current, which for instance may have a potential of 280 volt. It will be apparent that as the contact member 28 rotates a sinusoidally fluctuating potential will result between one end of the resistance 31 and the contact member 28 and this potential is applied to the deflecting plates 26 by the conductors 34 and 35 respectively. The conductor 35 is connected to the brush 36 engaging a slide ring 37 which is conductively connected with the contact member 28.

The electron beam in the Braun tube is thus deflected in both directions and produces a pressure-displacement diagram on the fluorescent screen 38.

What we claim is:

1. In combination, a member adapted to be secured in the spark plug aperture of an internal combustion engine, a piezoelectric pressure element, and a miniature spark plug, said member being provided with two acute angularly disposed bores, one end of which being directly in communication with the cylinder bore of the engine when said member is inserted in said spark plug aperture, the other ends of said bores having secured therein said piezoelectric pressure element and spark plug respectively, said miniature spark plug extending so far through said member that its sparking gap will be positioned at the same location in said spark plug aperture at which the sparking gap of a standard spark plug inserted in said aperture would be positioned.

2. In combination, a member adapted to be secured in the spark plug aperture of an internal combustion engine, a piezoelectric pressure element, and a spark plug, said member being provided with two acute angularly disposed bores, one end of which being in communication with each other at one end of said member, the other ends of said bores having secured therein said piezoelectric pressure element and spark plug respectively, said spark plug extending through the entire length of the bore in which it is mounted, so that the sparking gap is positioned at the very end of the bore where the latter communicates with the other bore.

3. In combination, a member adapted to be secured in the spark plug aperture of an internal combustion engine, a piezoelectric pressure element, and a spark plug, said member being provided with two acute angularly disposed bores, one end of which being in communication with each other and also with the cylinder bore of the engine when said member is inserted in said spark plug aperture, the other ends of said bores having secured therein said piezoelectric pressure element and spark plug respectively, said spark plug extending through the entire length of the bore in which it is mounted, so that the sparking gap is positioned at the very end of the bore where the latter communicates with the other bore.

4. In combination, a member adapted to be secured in the spark plug aperture of an internal combustion engine, a piezoelectric pressure element, and a miniature spark plug, said member being provided with two acute angularly disposed bores, one end of which being in communication with each other and also with the cylinder bore of the engine when said member is inserted in said spark plug aperture, the other ends of said bores having secured therein said piezoelectric pressure element and spark plug respectively, said miniature spark plug being secured in such a position on said member that its sparking gap will be positioned at the same location in said spark plug aperture at which the sparking gap of a standard spark plug inserted in said aperture would be positioned.

HANS HINTZE.
HANS ILLGEN.